(12) United States Patent
Chung

(10) Patent No.: US 6,738,046 B2
(45) Date of Patent: May 18, 2004

(54) COMPUTER MOUSE HAVING A WINDABLE OUTPUT WIRE

(76) Inventor: Yu-Lin Chung, No. 4, Lane 130, Nan-Kang Rd. Sec. 3, Taipei (TW)

( * ) Notice: Subject to any disclaimer, the term of this patent is extended or adjusted under 35 U.S.C. 154(b) by 256 days.

(21) Appl. No.: 10/042,900

(22) Filed: Jan. 8, 2002

(65) Prior Publication Data

US 2003/0128189 A1 Jul. 10, 2003

(51) Int. Cl.[7] ................................................. G09G 5/08
(52) U.S. Cl. ........................................ 345/163; 345/167
(58) Field of Search .............................. 345/163, 161, 345/162, 164, 165, 167

(56) References Cited

U.S. PATENT DOCUMENTS

| | | | | |
|---|---|---|---|---|
| 5,844,775 A | * | 12/1998 | Lundberg | 361/683 |
| 6,088,021 A | * | 7/2000 | Yong | 345/163 |
| 6,304,249 B1 | * | 10/2001 | Derocher et al. | 345/163 |
| 6,392,635 B1 | * | 5/2002 | Snyder | 345/163 |
| 6,421,044 B2 | * | 7/2002 | Murphy | 345/163 |
| 6,600,479 B1 | * | 7/2003 | Smith et al. | 345/163 |
| 2001/0043192 A1 | * | 11/2001 | Murphy | 345/163 |
| 2002/0005834 A1 | * | 1/2002 | Oh | 345/163 |
| 2002/0167492 A1 | * | 11/2002 | Lou et al. | 345/163 |
| 2003/0184521 A1 | * | 10/2003 | Sugita | 345/163 |

* cited by examiner

Primary Examiner—Joseph Mancuso
Assistant Examiner—Shaima Aminzay
(74) Attorney, Agent, or Firm—Pro-Techtor International Services

(57) ABSTRACT

The present invention is to provide a computer mouse having a windable output wire including a housing, a windable wire receiving device retractably mounted in the housing, and an output wire having a first end connected to the wire receiving device and a second end connected to an output plug that is inserted into a main frame of a computer. The output wire is wound around the fixing shaft center, thereby forming an inner circle structure of the output wire, and is wound around a mobile shaft center, thereby forming an outer circle structure of the output wire. The inner circle structure of the output wire and the outer circle structure of the output wire are along two opposite directions, thereby previously leaving a wire winding space, reducing the volume of the housing, and saving the cost of fabrication.

2 Claims, 5 Drawing Sheets

COMPUTER MOUSE HAVING A WINDABLE OUTPUT WIRE

BACKGROUND OF THE INVENTION

1. Field of the Invention

The present invention relates to a computer mouse having a windable output wire, and more particularly to a computer mouse having a windable output wire, wherein the inner circle and the outer circle of the output wire are in turn wound in the housing along two opposite directions in a coaxial manner, thereby reducing the volume of the housing, and saving the cost of fabrication.

2. Description of the Related Art

A conventional computer mouse has a slender output wire which has a first end connected into the housing of the mouse, and a second end having a plug that may be connected to the main frame of the computer. However, the output wire is long, and cannot be received in the mouse, so that a large part of the output wire is exposed outward from the mouse, thereby occupying a large space, and thereby causing inconvenience in storage of the output wire. In addition, the output wire is easily tangled with the other wires, thereby causing inconvenience to the user.

SUMMARY OF THE INVENTION

The present invention has arisen to mitigate and/or obviate the disadvantage of the conventional computer mouse.

The primary objective of the present invention is to provide a computer mouse having a windable output wire, wherein a slender output wire may be stored in the housing of the computer mouse. The computer mouse includes a housing, a windable wire receiving device retractably mounted in the housing, and an output wire having a first end connected to the wire receiving device and a second end connected to an output plug that is inserted into a main frame of a computer.

Another objective of the present invention is to provide a computer mouse having a windable output wire, wherein the output wire is wound around the fixing shaft center, thereby forming an inner circle structure of the output wire, and is wound around a mobile shaft center, thereby forming an outer circle structure of the output wire.

A further objective of the present invention is to provide a computer mouse having a windable output wire, wherein the inner circle structure of the output wire and the outer circle structure of the output wire are along two opposite directions, thereby previously leaving a wire winding space, reducing the volume of the housing, and saving the cost of fabrication.

In accordance with the present invention, there is provided a computer mouse having a windable output wire, comprising: a housing, a windable wire receiving device retractably mounted in the housing, and an output wire having a first end connected to the wire receiving device and a second end connected to an output plug that is inserted into a main frame of a computer.

The wire receiving device includes a fixing shaft center mounted in the housing, the fixed shaft center is connected with a wire fixing end, the output wire is fixed to the central wire fixing end, and may be extended into the housing, the output wire is wound around the fixing shaft center along an outer periphery of the fixing shaft center, thereby forming an inner circle structure of the output wire, the output wire is passed through a breach defined in one end of a mobile shaft center that covers and encompasses an outer periphery of the inner circle structure of the output wire, to wind along a reverse direction, to change the winding direction of the output wire, thereby forming an outer circle structure of the output wire, the output wire is extended outward from an outlet of the housing and is connected to the output plug.

Preferably, the circle number of the inner circle of the output wire is half of that of the outer circle of the output wire.

Further benefits and advantages of the present invention will become apparent after a careful reading of the detailed description with appropriate reference to the accompanying drawings.

DETAILED DESCRIPTION OF THE INVENTION

Figure 1:
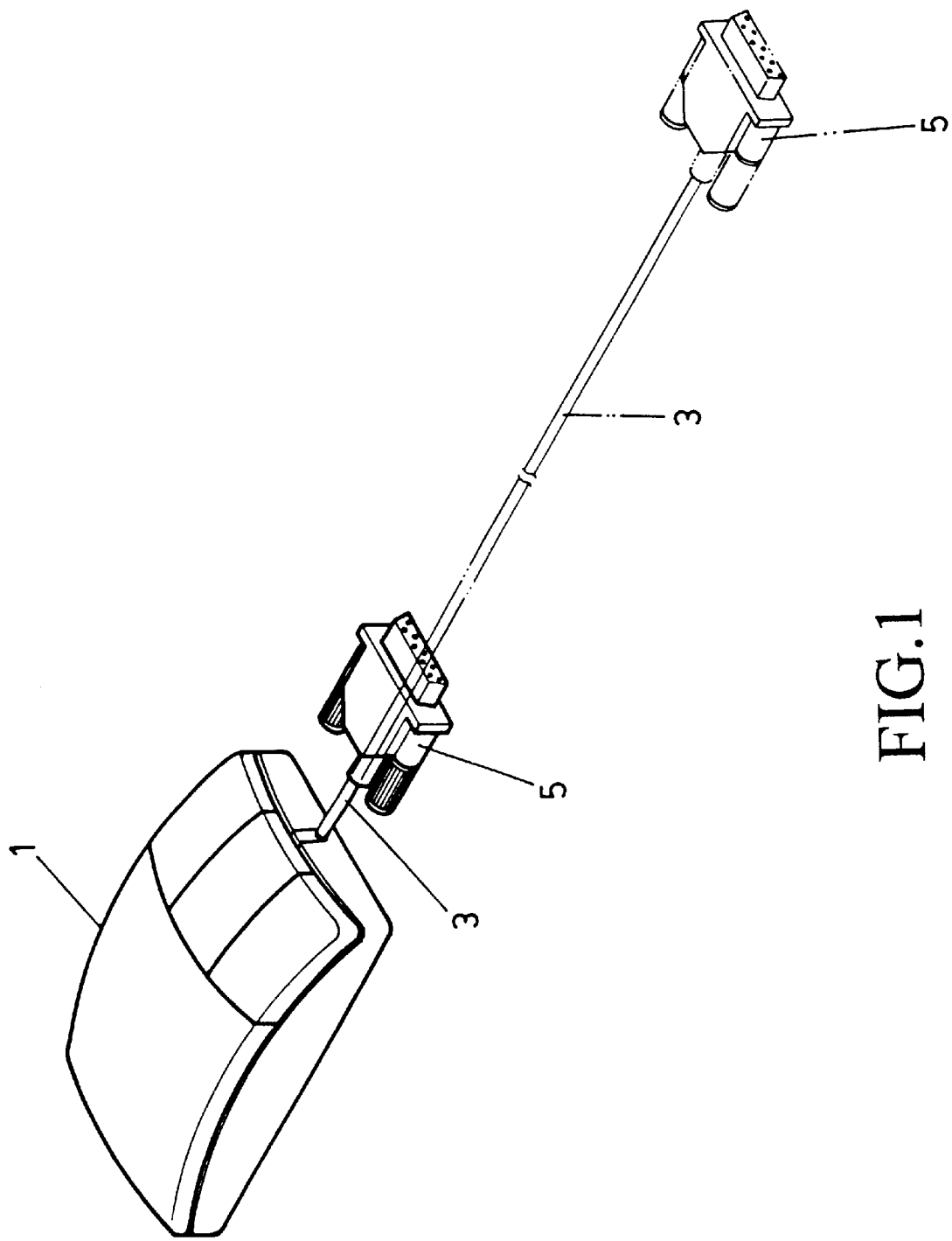
FIG. 1 is a perspective view of a computer mouse having a windable output wire in accordance with the present invention.
Figure 2:
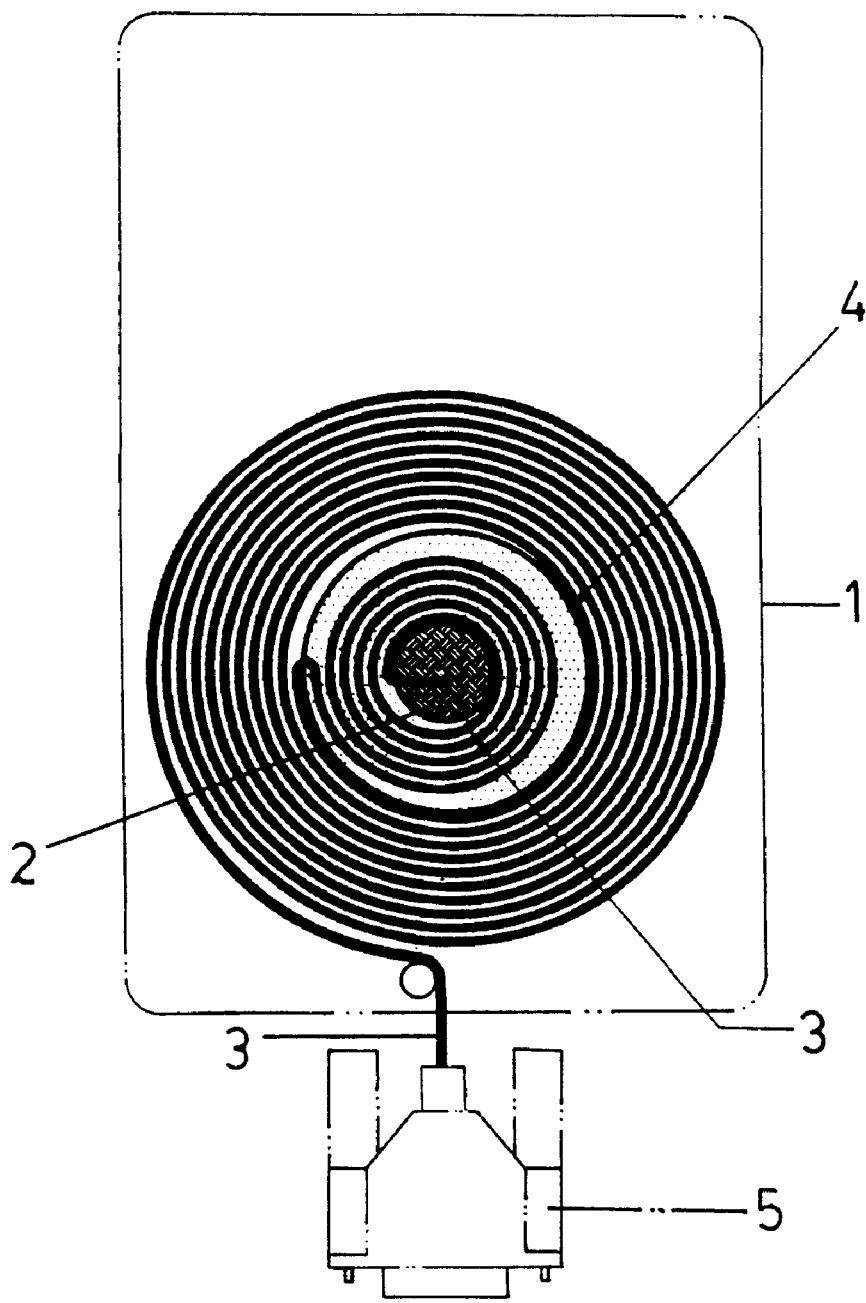
FIG. 2 is a schematic cross-sectional view of a computer mouse having a windable output wire in accordance with the present invention, wherein the output wire is stored in the housing.
Figure 3:
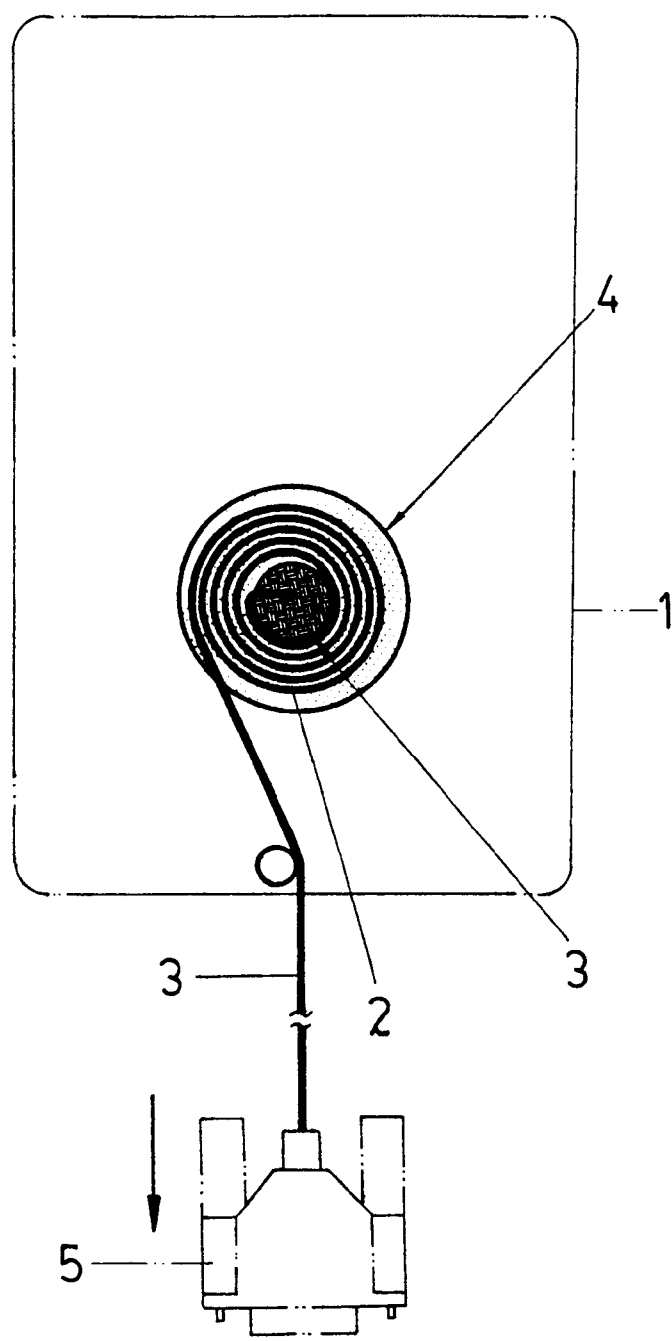
FIG. 3 is a schematic cross-sectional view of the computer mouse having a windable output wire in accordance with the present invention, wherein the output wire is pulled outward from the housing.

Referring to the drawings and initially to FIGS. 1–3, a computer mouse having a windable output wire in accordance with a preferred embodiment of the present invention comprises a housing 1, and a fixing shaft center 2 mounted in the housing 1. The fixed shaft center 2 is connected with a wire fixing end 31. An output wire 3 is fixed to the central wire fixing end 3, and is wound in the housing 1. The output wire 3 is wound around the fixing shaft center 2 along the outer periphery of the fixing shaft center 2, thereby forming the inner circle structure of the output wire 3 as shown in FIG. 2.

After the output wire 3 is wound on the fixing shaft center 2 to reach the position of the inner circle structure of the fixing shaft center 2, the output wire 3 is passed through a breach 41 (see FIG. 5) defined in one end of a mobile shaft center 4 that covers and encompasses the outer periphery of the inner circle structure of the output wire 3, to again wind along a reverse direction as shown in FIG. 2, thereby changing the winding direction of the output wire 3. Thus, the output wire 3 may be wound around the outer periphery of the mobile shaft center 4 along a reverse direction to change the winding direction of the output wire 3, thereby forming the outer circle structure of the output wire 3. The output wire 3 is then extended outward from the outlet 11 of the housing 1 and is connected to an output plug 5 which may be inserted into the main frame of the computer.

Figure 4:
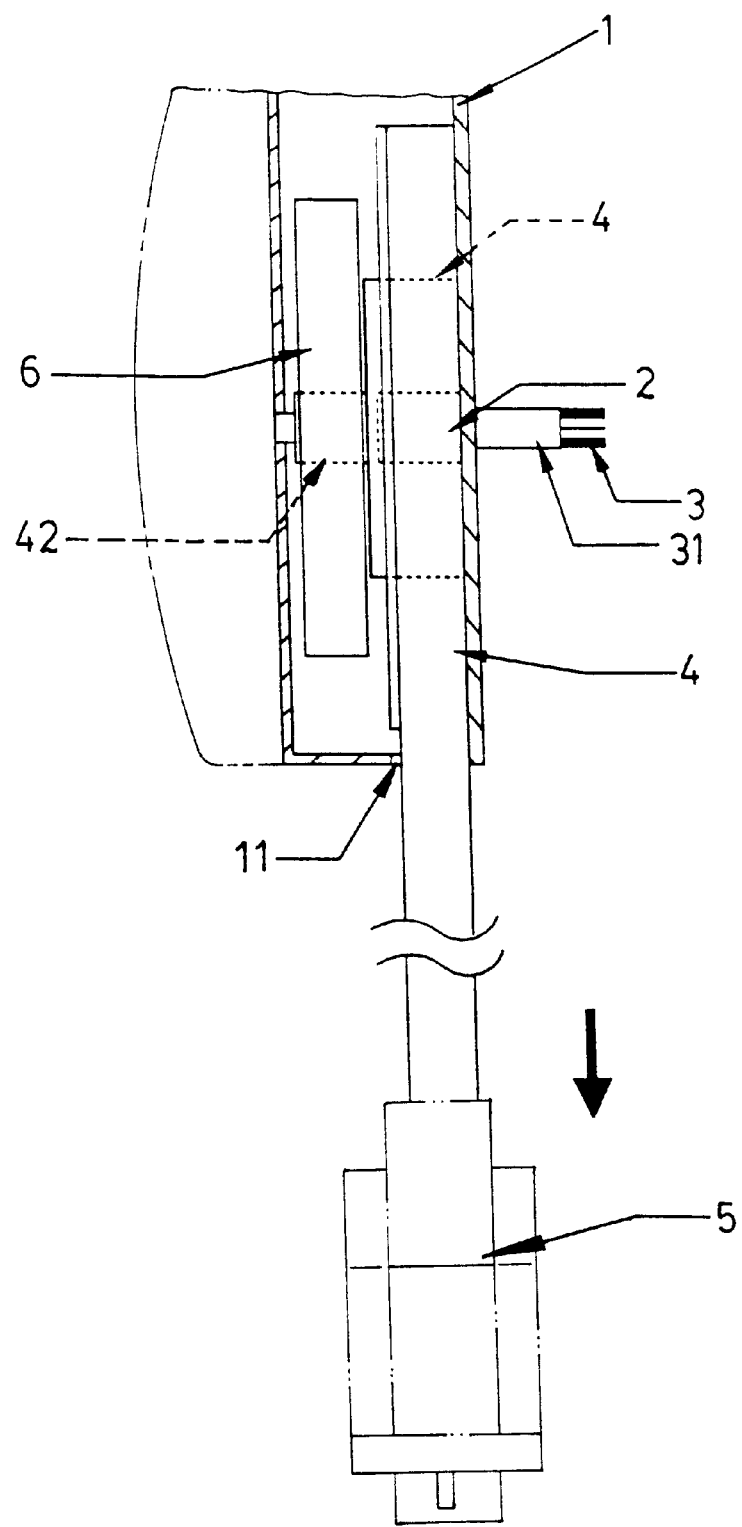
FIG. 4 is a side plan cross-sectional assembly view of the computer mouse having a windable output wire in accordance with the present invention.
Figure 5:
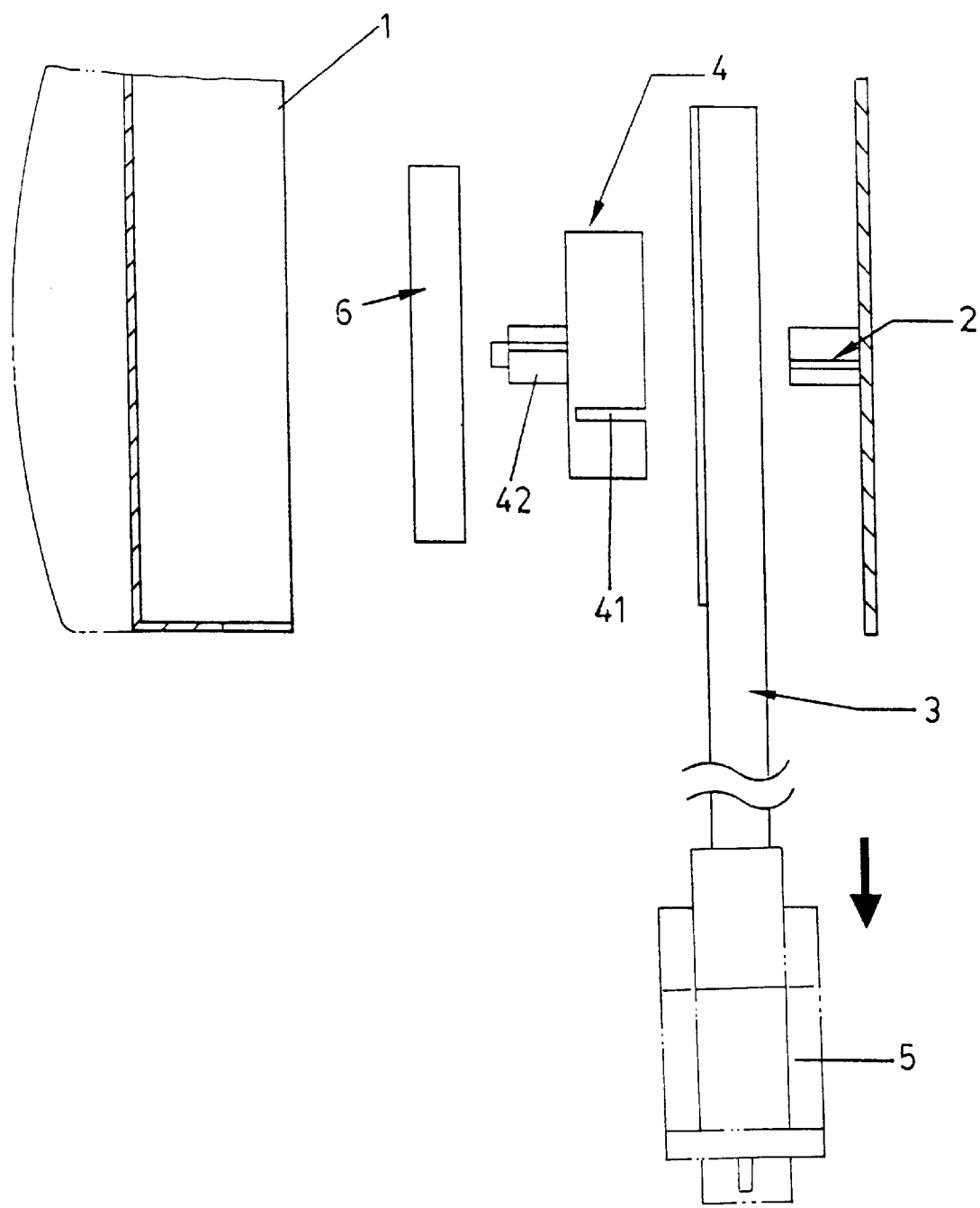
FIG. 5 is a side plan exploded view of the computer mouse having a windable output wire in accordance with the present invention.

Referring to FIGS. 4 and 5, one end of the inner side of the housing 1 has a tensile spring 6 which is connected to the shaft 42 of one end of the mobile shaft center 4. When the output wire 3 is pulled outward from the housing 1, a push button (not shown) may be pressed, so that the output wire 3 can be rapidly wound into the housing 1 to be stored and hidden by the restoring force of the tensile spring 6. The push button is a conventional structure, and will not be further described in detail.

According to the present invention, the fixing shaft center 2 and the mobile shaft center 4 are co-axial. Thus, as shown in FIG. 2, the circle number of the inner circle of the output wire 3 is half of that of the outer circle of the output wire 3. Namely, if the outer circle of the output wire 3 is wound through ten circles, the inner circle of the output wire 3 only needs to be wound through five circles. In comparison, the conventional wire receiving device is not divided into an inner circle and an outer circle, whereby the output wire is wound in the wire receiving device along one direction only, so that the volume the output wire cannot be shortened.

When the output wire 3 is pulled outward from the housing 1, the outer circle of the output wire 3 is pulled outward through an amount of the output wire 3, while the coaxial inner circle of the output wire 3 that is directed to the reverse direction may wind (or absorb) the same amount of the output wire 3. When the outer circle of the output wire 3 is pulled outward to the limit position, and when the inner circle of the output wire 3 is to be pulled outward, the inner circle of the output wire 3 will increase an amount of the output wire 3. Accordingly, by the design of the opposite directions of the inner circle and the outer circle of the output wire 3 of the present invention, the volume of the computer mouse having a windable output wire of the present invention can be reduced, and the housing 1 is made to have a miniature volume without any electrical brush connection point, thereby saving the cost of fabrication.

In conclusion, in the computer mouse having a windable output wire in accordance with the present invention, the inside of the housing has a coaxial structure consisting of the fixing shaft center and the mobile shaft center, so as to divide the output wire into the inner circle and the outer circle which are wound in the opposite directions, thereby previously leaving a wire winding space, reducing the volume of the housing, and saving the cost of fabrication.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A computer mouse having a windable output wire, comprising:

a housing, a windable wire receiving device retractably mounted in the housing, and an output wire having a first end connected to the wire receiving device and a second end connected to an output plug that is inserted into a main frame of a computer; wherein the wire receiving device includes a fixing shaft center mounted in the housing, the fixed shaft center is connected with a wire fixing end, the output wire is fixed to the central wire fixing end, and may be extended into the housing, the output wire is wound around the fixing shaft center along an outer periphery of the fixing shaft center, thereby forming an inner circle structure of the output wire, the output wire is passed through a breach defined in one end of a mobile shaft center that covers and encompasses an outer periphery of the inner circle structure of the output wire, to wind along a reverse direction, to change the winding direction of the output wire, thereby forming an outer circle structure of the output wire, the output wire is extended outward from an outlet of the housing and is connected to the output plug.

2. The computer mouse having a windable output wire in accordance with claim 1, wherein the circle number of the inner circle of the output wire is half of that of the outer circle of the output wire.

\* \* \* \* \*